Patented Sept. 6, 1932

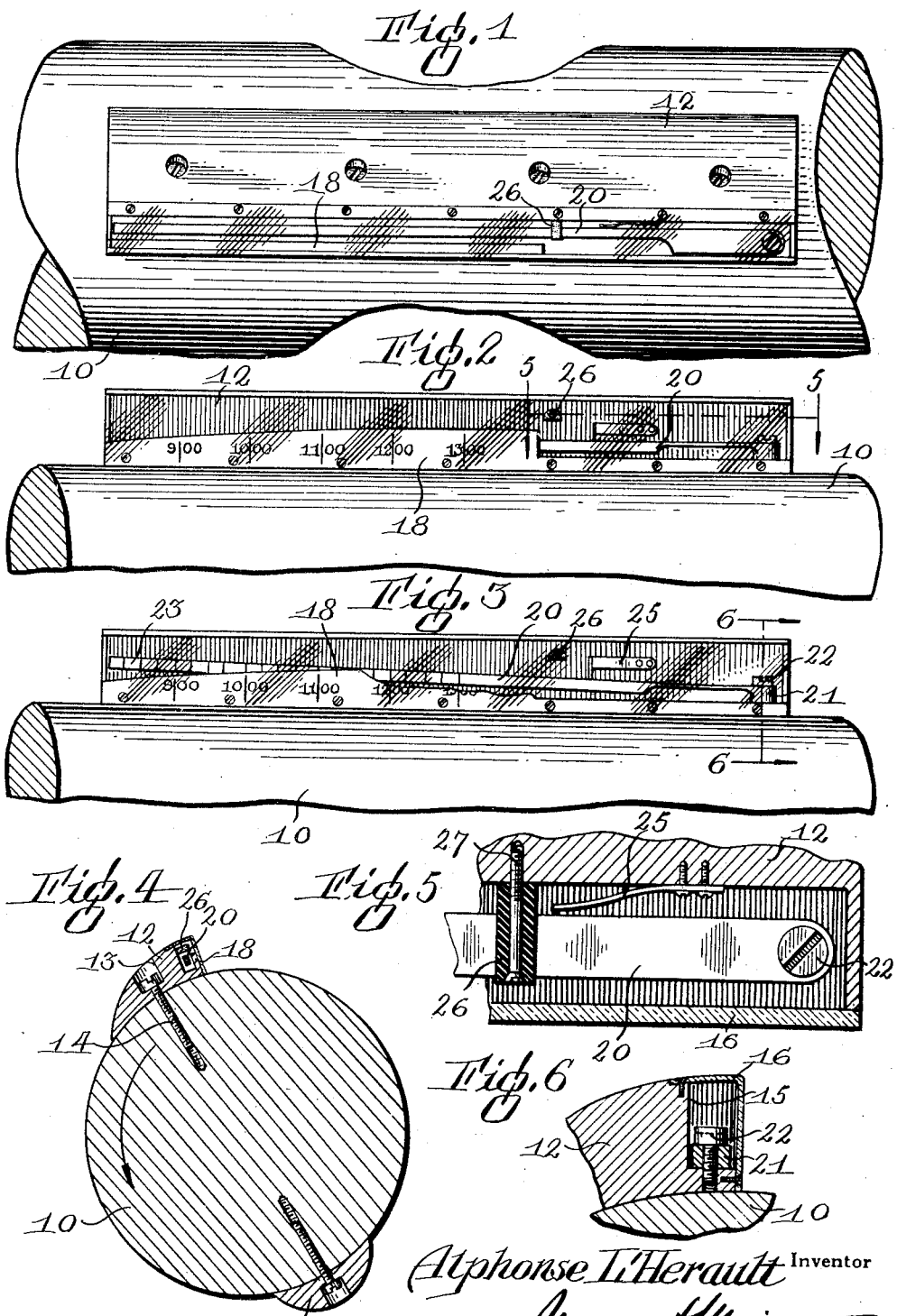

1,875,470

UNITED STATES PATENT OFFICE

ALPHONSE L'HÉRAULT, OF THREE RIVERS, QUEBEC, CANADA

SPEED INDICATOR

Application filed June 16, 1931. Serial No. 544,914.

The present invention relates to devices for indicating the rotary speed of shafts and the like and has for its primary object the provision of an indicating device designed to give a direct indication of the rotating parts in revolutions per minute.

A further object of the invention is the provision of a shaft or the like speed indicating device which will be accurate and reliable in use.

Another object of the invention is the provision of an indicator of the above character which will be relatively simple in construction and which may be conveniently attached to a rotatable shaft.

Other objects and advantages of the invention will become apparent as the description progresses.

In the accompanying drawing forming a part of this specification and in which like reference characters are employed to designate corresponding parts throughout the same:

Figure 1 is a top plan view of the device shown attached to a shaft,

Figure 2 is a front elevational view of the same,

Figure 3 is a similar view showing the device in operative arrangement and partly broken away, Figure 4 is a transverse sectional view through the shaft and indicating device, Figure 5 is an enlarged fragmentary section taken on the line 5—5 of Figure 2, and Figure 6 is an enlarged fragmentary transverse section taken on the line 6—6 of Figure 3.

Referring to the drawing, wherein for the purpose of illustration is shown a preferred embodiment of the invention, the numeral 10 designates a fragmentary portion of a rotatable shaft, of circular cross section, upon which the improved speed indicating device is to be mounted.

Secured longitudinally upon the exterior periphery of the shaft, so as to extend lengthwise of the axis of the shaft, is an elongated body strip 12. In transverse cross section, the strip 12 is of arcuate form having a diminishing taper to one longitudinal edge, the inner face of the strip conforming to the curvature of the shaft while the outer face is of a curvature of decreased radius. At longitudinally spaced intervals, the body strip is provided with counterbored openings 13 registering with threaded bores in the shaft so that the body may be rigidly connected with the shaft by means of screws 14.

The front edge of the body strip is recessed, as indicated at 15, throughout its length. An angular strip of transparent material, indicated at 16, formed to provide a front and top plate, is attached to the front edge of the body so as to form an elongated chamber of substantially rectangular cross section in the front of the strip.

Extending longitudinally at the forward portion of the chamber from one end thereof to a predetermined point short of the opposed end is a scale forming plate 18 disposed in a radial plane with respect to the shaft. In the present instance, the scale plate extends from the left end of the body chamber to a point intermediate the centre and right end thereof, the plate being preferably provided with a diminishing taper from its intermediate portion to the left or forward end thereof.

At longitudinally spaced intervals the scale plate 18 is provided with transverse graduations adjacent the upper edge and identified by numerals, in the present instance designating variations of 100 R. P. M.

Mounted longitudinally within the body chamber, inwardly of the plate 18 is an elongated indicator arm 20, in the present instance provided with an annular bearing collar 21. A fastening screw 22 is extended through the collar 21 and threadedly engages a threaded bore in the bottom of the chamber so that the collar 21 is rigidly connected with the body strip. As shown to advantage in Figures 2 and 3, the collar 21 is disposed adjacent the right hand extremity of the chamber, the opposed end of the arm 20 terminating short of and adjacent the opposed left hand end thereof. The arm, which is preferably formed of metal, is flattened transversely adjacent its fixed end so as to render the same sufficiently resilient to perform the function for which it is designed.

The resilient arm 20 is constructed and so mounted as to assume a position parallel with the axis of the shaft when the shaft is at rest. When the shaft is rotatably actuated, the arm is designed so that the outer free portion will swing outwardly therefrom by centrifugal force. As will be noted from Figure 3, the free end portion of the arm is provided with engraved graduations 23 arranged at longitudinally spaced intervals; these graduations being designed to facilitate the reading of the indicated speed in providing a mark permitting the exact location of the arm's upper edge with respect to the scale 18.

Oscillatory movement of the resilient arm 20 is avoided by the provision of a spring 25 having one end rigidly secured to the inner wall of the body strip and the opposed end bent outwardly to permanently contact with the arm, as shown to advantage in Figure 5. The swinging outward movement of the arm is limited by means of a stop embodying a tubular cushioning sleeve 26 formed of rubber or other suitable cushioning material attached to the inner wall by means of a screw 27. The sleeve 26 projects transversely above the arm so as to limit the outward swinging movement thereof in the event that the shaft should be rotated at a speed above that of the operation of the indicator.

In order to counterbalance the weight of the body strip 12 upon the shaft or the like, a counterbalancing strip 30 is attached to the exterior peripheral surface thereof at a diametrically opposed position, as shown in Figure 4, so as to maintain a proper balance of the shaft or the like.

In use, during rotary operation of the shaft 10, the revolution speed, within a definite range, may be observed from a position at right angles to the shaft and opposite the body strip 12.

In this connection, it is pointed out that reading of the scale is perfectly feasible, even when the shaft is in movement, due to the phenomenon called "persistence of vision." When the eye of an observer is properly located, a particular graduation of the scale is perfectly visible to the exclusion of others, due to the parallax effect blurring the graduations out of the line of the observer's eye. Inasmuch as a good local lighting of the scale is advisable to facilitate reading of the instrument, it has been found objectionable to use a front lighting in view of disturbing reflections in the glass 16. An oblique lighting, such as provided by a flash light or pocket lamp, entirely avoids these reflections and brings into prominence the graduations of the arm 20 thereby greatly increasing the accurate readability of the device.

The rotary speed in R. P. M. is designated by the relative position of the resilient arm 20 with respect to the graduated scale 18. As noted from Figure 3, the arm is provided with graduations corresponding to those on the fixed scale, as well as intermediate graduations indicating fractional divisions so that an indication within 100 R. P. M. may be noted. The arm and the scale are so designed that the respective graduations of the arm will, at predetermined speeds of the shaft, coincide with the designated divisions of the scale. In other words, as the rotary speed of the shaft increases the outer graduated portion of the arm is swung, in accordance with the increase in speed, away from the shaft and the coincidence between the upper edge of the arm and the upper edge of the scale will indicate the speed in R. P. M.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:

1. A device for indicating the rotary speed of a rotating member comprising an elongated scale attached to the exterior surface of the rotating member and extending lengthwise of the axis of the rotating member, and a resilient member fastened at one end to the rotating member disposed to swing outwardly by the centrifugal force exerted by the rotating member during the rotary operation thereof co-operating with the scale to indicate the rotary speed of the rotating member.

2. In a device for indicating the rotary speed of a rotating member, a graduated scale attached to the exterior periphery of the rotating member and extending lengthwise of the axis of the rotating member, and a resilient arm having one end attached to the rotating member and mounted so that the major portion thereof may swing radially outward from the rotating member by the centrifugal force exerted during the rotary operation of the rotating member, the swinging portion of the said arm being graduated to co-operate with the scale to indicate the rotary speed of the rotating member.

3. In a device for indicating the rotary speed of a rotating member, a scale having graduations identified by numerals designating revolutions per minute extending lengthwise of the axis of the rotating member, a resilient arm having one end attached to the rotating member and the opposed portion disposed to swing radially from the rotating member under centrifugal force during rotary operation of the rotating member, the said arm being provided with graduations co-operating with the scale to indicate the speed in revolutions per minute, and a resilient member contacting with the arm to obviate oscillatory movement thereof.

4. In a device for indicating the rotary speed of a rotating member, a casing attached to the exterior periphery of the rotating member in a longitudinally extending position, a graduated scale extending longitudinally in the casing having the graduations identified by numerals designating revolutions per minute, a resilient indicator arm having one end secured in the casing, the said arm extending parallel with the scale and normally assuming a position parallel with the axis of the rotating member adapted to swing radially outward by centrifugal force exerted during the rotary operation of the rotating member to co-operate with the scale to designate the speed of the rotating member in revolutions per minute.

5. In a device for indicating the rotary speed of a rotating member, a casing attached to the exterior periphery of the rotating member in a longitudinally extending position, a graduated scale extending longitudinally in the casing having the graduations identified by numerals designating revolutions per minute, a resilient indicator arm having one end secured in the casing, the said arm extending parallel with the scale and normally assuming a position parallel with the axis of the shaft adapted to swing radially outward by a centrifugal force exerted during the rotary operation of the rotating member to co-operate with the scale to designate the speed of the rotating member in revolutions per minute, and a spring member contacting with the side of the resilient arm.

In witness whereof I have hereunto set my hand.

ALPHONSE L'HÉRAULT.